US008364525B2

(12) United States Patent
Kothiwal et al.

(10) Patent No.: US 8,364,525 B2
(45) Date of Patent: Jan. 29, 2013

(54) USING CLICKED SLATE DRIVEN CLICK-THROUGH RATE ESTIMATES IN SPONSORED SEARCH

(75) Inventors: Divy Kothiwal, Sunnyvale, CA (US); Kannan Achan, Mountian View, CA (US); Eren Manavoglu, Menlo Park, CA (US); Erick Cantu-Paz, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 293 days.

(21) Appl. No.: 12/956,496

(22) Filed: Nov. 30, 2010

(65) Prior Publication Data

US 2012/0136722 A1    May 31, 2012

(51) Int. Cl.
  *G06Q 30/00*  (2006.01)
(52) U.S. Cl. ...................................... 705/14.1
(58) Field of Classification Search .................. 705/14.1
  See application file for complete search history.

(56) References Cited

U.S. PATENT DOCUMENTS

2008/0256034 A1 * 10/2008 Chang et al. ................... 707/3

* cited by examiner

*Primary Examiner* — Daniel Lastra
(74) *Attorney, Agent, or Firm* — Stattler-Suh PC

(57) ABSTRACT

A computer-implemented method and system for selecting a subject advertisement in a sponsored search system based on a user's commercial intent (pertaining to the subject advertisement), using techniques for determining intent-driven clicks from a historical database. The method includes steps for aggregating a training model dataset wherein the training model dataset contains a selected history of clicks. Then, selecting from the training model dataset, a clicked slate (further selection of clicks), the clicked slate comprising a set of clicked ads, and calculating an intent-driven click feedback value for the subject advertisement. The method includes techniques for selecting a clicked slate using features corresponding to clicks received within a particular time period (the time period determined statically or dynamically). A system for implementing the method includes aggregating data from a historical database using selectors such as a position selector, a click feature selector, an impression-advertiser-campaign-creative selector, and a commercial intent selector.

20 Claims, 7 Drawing Sheets

USING CLICKED SLATE DRIVEN CLICK-THROUGH RATE ESTIMATES IN SPONSORED SEARCH

FIELD OF THE INVENTION

The present invention is directed towards internet search advertising, and more particularly toward improving click-through rate estimates in sponsored search.

BACKGROUND OF THE INVENTION

Sponsored search is an important source of revenue for large commercial search engines. In the operation of a large commercial search engine, when a user issues a search query, in addition to the organic search results, the search results page is composited to show a set of sponsored ads, and such a set of sponsored ads are laid out within the search results page. Typically, ads are arranged in areas proximal to the organic search results (e.g. in the North, East and South areas of the results page). Large commercial search engines often operate on a pay-per-click revenue model, and revenue optimization is at least in part tied to the volume of actual user clicks on an ad placed within a search results page (i.e. an impression). Therefore it is important to select ads for placement within the impression that have reasonably high likelihood of receiving a click by the user. In the operation of a large commercial search engine, various quantitative techniques are employed to estimate the likelihood of receiving a click by the user or the click-through rate (CTR). Often the CTR is used in combination with the monetary value (i.e. revenue opportunity value) of a corresponding click in order to place the potentially higher revenue generating ads in the more prominent positions of the search results page, thus further optimizing revenue potential from a given impression.

However, traditional quantitative techniques for calculating the CTR suffer from several shortcomings, including that traditional techniques for calculating the CTR considers all impressions equally, even though not all impressions are indeed equal—at least not all impressions are indeed equal with respect to the underlying commercial intent of the user to whom the impression is presented. If quantitative techniques for calculating the CTR could discern (e.g. using some form of a historical confidence value or clicked slate) and consider the features of the clicked slate in calculating the CTR, then the usefulness of the improved CTR could be exploited.

Thus, for this and other reasons, what is needed are techniques for using clicked slate driven click-through rate estimates in sponsored search.

SUMMARY OF THE INVENTION

A computer-implemented method and system for selecting a subject advertisement in a sponsored search system based on a user's commercial intent (pertaining to the subject advertisement), using techniques for determining intent-driven clicks from a historical database. The method includes steps for aggregating a training model dataset wherein the training model dataset contains a selected history of clicks. Then, selecting from the training model dataset, a clicked slate (further selection of clicks), the clicked slate comprising a set of clicked ads, and calculating a commercial intent-driven click feedback value for the subject advertisement. The method includes techniques for selecting a clicked slate using features corresponding to clicks received within a particular time period (the time period determined statically or dynamically). A system for implementing the method includes aggregating data from a historical database using selectors such as a position selector, a click feature selector, an impression-advertiser-campaign-creative selector, and a commercial intent selector.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
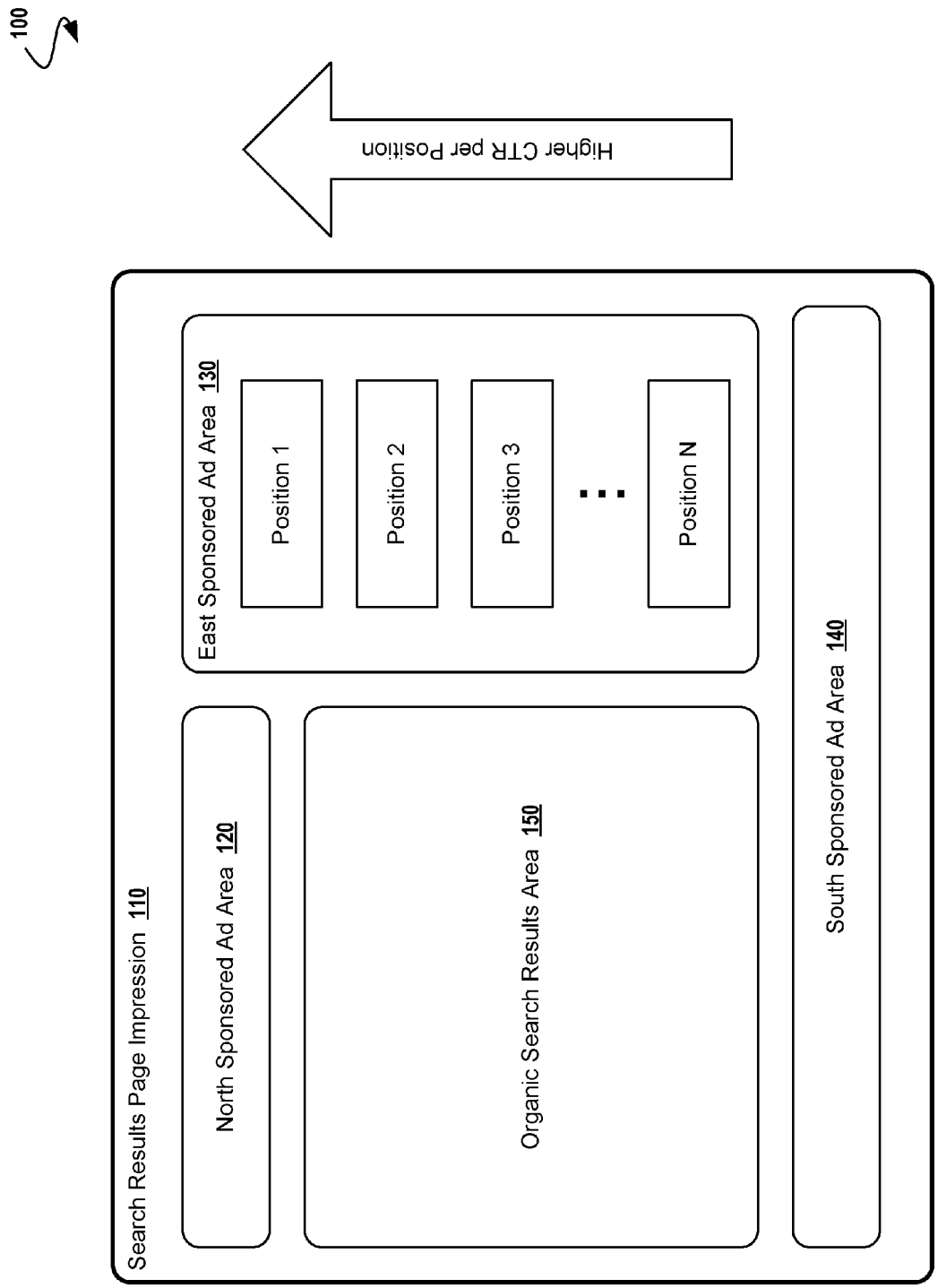
FIG. 1 depicts a diagram showing increasing click-through rates based on location within a search results page

In the following description, numerous details are set forth for purpose of explanation. However, one of ordinary skill in the art will realize that the invention may be practiced without the use of these specific details. In other instances, well-known structures and devices are shown in block diagram form in order to not obscure the description of the invention with unnecessary detail.

DEFINITIONS

Some of the terms used in this description are defined below (in alphabetical order) for easy reference. These terms are not rigidly restricted to these definitions. A term may be further defined by the term's use in other sections of this description.

"Ad" (e.g. ad, item and/or message) means a paid announcement, as of goods or services for sale, preferably on a network such as the internet. An ad may also be referred to as an ad, an item and/or a message.

"Ad call" means a message sent by a computer to an ad server for requesting an ad to be displayed.

"Ad click-through rate" (e.g. click-through rate or CTR) means the ratio of ad clicks over ad impressions.

"Ad code" means the HTML or other markup language description that describes an advertisement or message in such a manner as can be parsed by a browser. Ad code may include references to other ad code. Ad code may mean any subset, or portion or segment of ad code that describes an advertisement or message in such a manner as can be parsed by a browser.

"Ad server" is a server that is configured for serving one or more ads to user devices. An ad server is preferably controlled by a publisher of a website and/or an advertiser of online ads. A server is defined below.

"Advertiser" (e.g. messenger and/or messaging customer, etc) means an entity that is in the business of marketing a product and/or a service to users. An advertiser may include, without limitation a seller and/or a third-party agent for the seller. An advertiser may also be referred to as a messenger and/or a messaging customer. Advertising may also be referred to as messaging.

"Advertising" means marketing a product and/or service to one or more potential consumers by using an ad. One example of advertising is publishing a sponsored search ad on a website.

"Application server" is a server that is configured for running one or more devices loaded on the application server. For example, an application server may run a device configured for deducing shadow profiles.

"Click" (e.g. ad click) means a selection of an ad impression by using a selection device such as, for example, a computer mouse or a touch-sensitive display.

"Client" means the client part of a client-server architecture. A client is typically a user device and/or an application that runs on a user device. A client typically relies on a server to perform some operations. For example, an email client is an application that enables a user to send and receive email via an email server. In this example, the computer running such an email client may also be referred to as a client.

"Conversion" (e.g. ad conversion) means a purchase of a product/service that happens as a result of a user responding to an ad and/or a coupon.

"Coupon" (e.g. coupon ad) means a portion of a certificate, ticket, label, ad or the like set off from the main body by dotted lines or the like to emphasize its separability, entitling the holder to something, such as a gift or discount, or for use as an order blank or a contest entry form, etc. A coupon is designed in a convenient format for a user to "take" the coupon to a seller to receive an advertised benefit.

"Database" (e.g. database system, etc) means a collection of data organized in such a way that a computer program may quickly select desired pieces of the data. A database is an electronic filing system. In some instances, the term "database" is used as shorthand for a "database management system". A database may be implemented as any type of data storage structure capable of providing for the retrieval and storage of a variety of data types. For instance, a database may comprise one or more accessible memory structures such as a CD-ROM, tape, digital storage library, flash drive, floppy disk, optical disk, magnetic-optical disk, erasable programmable read-only memory (EPROM), random access memory (RAM), magnetic or optical cards, etc.

"Device" means hardware, software or a combination thereof. A device may sometimes be referred to as an apparatus. Examples of a device include, without limitation, a software application such as Microsoft Word™ or a database, or hardware such as a laptop computer, a server, a display, or a computer mouse and/or a hard disk.

"Impression" (e.g. ad impression) means a delivery of an ad to a user device for viewing by a user.

"Item" means an ad, which is defined above.

"Marketplace" means a world of commercial activity where products and/or services are browsed, bought and/or sold, etc. A marketplace may be located over a network, such as the internet. A marketplace may also be located in a physical environment, such as a shopping mall.

"Message" means an ad, which is defined above.

"Messaging" means advertising, which is defined above.

"Messenger" means an advertiser, which is defined above.

"Network" means a connection, between any two or more computers, that permits the transmission of data. A network may be any combination of networks including, without limitation, the internet, a local area network, a wide area network, a wireless network, and/or a cellular network.

"Publisher" means an entity that publishes, on a network, a web page having content and/or ads, etc.

"Server" means a software application that provides services to other computer programs (and their users), on the same computer or on another computer or computers. A server may also refer to the physical computer that has been set aside to run a specific server application. For example, when the software Apache HTTP Server is used as the web server for a company's website, the computer running Apache may also be called the web server. Server applications may be divided among server computers over an extreme range, depending upon the workload.

"Slate" (e.g., ad slate) refers to the ordered list of ads returned by a server in response to a query.

"Social network" means a networked software application having user accounts (e.g. nodes) that are coupled by using one or more interdependencies such as, for example, friendship, kinship, common interest, financial exchange, dislike, sexual relationship, beliefs, knowledge and/or prestige. Examples of a social network include without limitation Facebook™, Twitter™, Myspace™, Delicious™, Digg™, and/or Stumble Upon™.

"Software" means a computer program that is written in a programming language that may be used by one of ordinary skill in the art. The programming language chosen should be compatible with the computer on which the software application is to be executed and, in particular, with the operating system of that computer. Examples of suitable programming languages include, without limitation, Object Pascal, C, C++ and/or Java. Further, the functions of some embodiments, when described as a series of steps for a method, could be implemented as a series of software instructions for being operated by a processor such that the embodiments could be implemented as software, hardware, or a combination thereof. Computer-readable media are discussed in more detail in a separate section below.

"System" means a device or multiple coupled devices. A device is defined above.

"User" (e.g. consumer, etc) means an operator of a user device. A user is typically a person who seeks to acquire a product and/or service. For example, a user may be a woman who is browsing Yahoo!™ Shopping for a new cell phone to replace her current cell phone. The term "user" may also refer to a user device, depending on the context.

"User device" (e.g. computer, user computer, client and/or server, etc) means a single computer or a network of interacting computers. A user device is a computer that a user may use to communicate with other devices over a network, such as the internet. A user device is a combination of a hardware system, a software operating system, and perhaps one or more software application programs. Examples of a user device include, without limitation, a laptop computer, a palmtop computer, a smart phone, a cell phone, a mobile phone, an IBM-type personal computer (PC) having an operating system such as Microsoft Windows™, an Apple™ computer having an operating system such as MAC-OS, hardware having a JAVA-OS operating system, and/or a Sun Microsystems™ workstation having a UNIX operating system.

"Web browser" means a software program that may display text or graphics or both, from web pages on websites. Examples of a web browser include, without limitation, Mozilla Firefox™ and Microsoft Internet Explorer™.

"Web page" means documents written in a mark-up language including, without limitation, HTML (hypertext markup language), VRML (virtual reality modeling language), dynamic HTML, XML (extensible mark-up language), and/or other related computer languages. A web page may also refer to a collection of such documents reachable through one specific internet address and/or through one specific website. A web page may also refer to any document obtainable through a particular URL (uniform resource locator).

"Web portal" (e.g. public portal) means a website or service that offers a broad array of resources and services such as, for example, email, forums, search engines, and online shopping malls. The first web portals were online services, such as AOL, that provided access to the web. However, now, most of the traditional search engines (e.g. Yahoo!™) have transformed themselves into web portals to attract and keep a larger audience.

"Web server" is a server configured for serving at least one web page to a web browser. An example of a web server is a Yahoo!™ web server. A server is defined above.

"Website" means one or more web pages. A website preferably includes a plurality of web pages virtually connected to form a coherent group.

Overview

Sponsored search is an important source of revenue for large commercial search engines. In the operation of a large commercial search engine, when a user issues a search query, in addition to the organic search results, the search results page is composited to show a set of sponsored ads, and such a set of sponsored ads are laid out within the search results page.

Large commercial search engines often operate on a pay-per-click revenue model, and revenue optimization is at least in part tied to the volume of actual user clicks on an ad placed within a search results page impression 110. Therefore, it is important to select and order ads for placement within the impression that have reasonably high probabilities of receiving a click by the user. Various quantitative techniques are employed to estimate the probability of receiving a click by the user (e.g. click-through rate, or CTR). Often the click probability is used in combination with the monetary value that an advertiser is willing to pay for a click (i.e. a bid) in order to place the potentially higher revenue generating ads in the more prominent positions of the search results page, thus further optimizing revenue potential from a given impression.

FIG. 1 depicts a diagram showing increasing click-through rates based on location within a search results page. As shown, diagram 100 depicts a search results page impression 110 having a north sponsored ad area 120, an east sponsored ad area 130, and a south sponsored ad area 140. The aforementioned areas proximally surround the organic search results area 150. Typically, ads are arranged in areas proximal to the organic search results (e.g. in the North, East and South areas of the results page as shown and described).

Several eye tracking studies support hypotheses suggesting a direct relationship between clickability (likelihood of a click) and the northerly position of an ad in an impression (as shown in FIG. 1).

Indeed, the placement position of an ad within an impression (i.e. position) impacts the clickability of ads significantly, and aspects of position influence bidding, which in turn impacts captured revenue. As hereinabove described, and as is generally the empirical case, ads appearing closer to the bottom of a page are less likely to receive a click than the ones appearing closer to the top. Techniques and systems for placing ads in a ranking position within a search results impression are further described herein.

Overview of Networked Systems for Sponsored Search Advertising

In the context of internet advertising, placement of sponsored search advertisements within a search results page (e.g. using an online advertising system 200 of FIG. 2) has become common. An internet advertiser or agent may select a particular search engine property (e.g. Yahoo.com, www.bing.com), and may create an advertisement such that whenever any internet user, via a client system 205, renders a web page from the selected property (e.g. a search results page), possibly using a search engine server 206, the advertisement (e.g. a creative) is composited on the web page by one or more servers (e.g. a base content server 209, an additional content server 208) for delivery to a client system 205 over a network 230. Given this generalized delivery model, and using techniques disclosed herein, sophisticated sponsored search advertising might be practiced.

Again referring to FIG. 2, an internet property (e.g. a publisher hosting the publisher's base content 218 on a base content server 209) might be able to measure the characteristics of visitors (which visitors may have any arbitrary interest, demographic, target predicates, or other attributes) possibly using an additional content server 208 in conjunction with a data gathering and statistics module 212, and possibly also using a historical dataset 220 as pertains to user behavior observed at a search engine server 206 (or user behavior observed at any other location). Thus, an internet user's demographics and interest might be 'known' in quite some detail as pertains to a wide range of user queries, interest categories, or other demographics or attributes. Also, behaviors (e.g. the likelihood of a click or other measurable event) might be known in quite some detail, not only for a particular user, but also for a group of users corresponding to a particular subset of the available data. Such characteristics (i.e. one or more characteristics) and/or features (i.e. one or more features) can be used in statistical modeling of users. That is, a given model can predict the likelihood p of a click c based on a feature set, and thus, a given model can be used to calculate probability $p(c|x)$, that quantity being the probability of a user click response based on the constituents of x.

Such characteristics (i.e. one or more characteristics) and/or features can be used in the statistical modeling of users, even to the extent that a forecasting module 211, possibly in conjunction with a data gathering and statistics module 212 can forecast future supply accurately—at least to a statistically known degree.

In some embodiments, the online advertising system 200 might host a variety of modules to serve management and control operations (e.g. an objective optimization module 210, a forecasting module 211, a data gathering and statistics module 212, an advertisement serving module 213, an automated bidding management module 214, an admission control and pricing module 215, etc) pertinent to aiding advertisers in defining effective sponsored search advertising campaigns and for serving advertisements to users. In particular, the modules, network links, algorithms, forecasting techniques, serving policies, and data structures embodied within the online advertising system 200 might be specialized so as to perform a particular function or group of functions reliably while observing capacity and performance requirements. For example, a campaign generation module 219, a click probability estimator module 216, and/or an automated user intent discerner module 217 can operate partly in an offline (or batch) mode and partly in an online (or interactive) mode. Further, a database for storing the historical dataset 220 (which can also store historical click data and/or forecasted data) can operate in an online mode or in an offline mode, or both. As shown, and without regard to allocation of any particular operation to any particular mode, an auction server 207, a click probability estimator module 216 and an automated user intent discerner module 217, possibly using a commercial intent-driven click feedback value 240 can operate cooperatively to implement an online advertising system using clicked slate intent-driven click-through rate estimates.
Overview of Click Rate Estimators in Sponsored Search Advertising One technique used in online advertising is to estimate the probability of click (e.g. how likely a user will click on an ad given a query). Such an estimate is used, possibly together with the bid, in ranking the candidate ads for placement. A reliable probability estimate enables the online advertising system to serve advertisements or messages that improve revenue by increasing the click-through rate.
Weight Modeling For click prediction, a query-advertisement pair is represented by a feature vector x and a binary indicator y (e.g. 1 for a click and 0 for not-a-click). A training data set D, consisting of historical (x, y) pairs may be extracted from sponsored search logs. The adaptive modeling system may then build a model for p(y|x) using D. In some embodiments, the logistic regression technique from statistics may be used to model p(y|x) as:

$$p(y=1\mid x) = \frac{1}{1+\exp(-w^T x)}$$

In some embodiments, the weight vector, w, is estimated using maximum entropy (ME) models. Specifically, the technique maximizes a regularized likelihood function defined over D using a Gaussian prior over w. The weight vector, w, is obtained by maximizing the following objective function with respect to w:

$$G(w\mid \lambda, D) = \sum_{(x_j, y_j)\in D} \log\left(\frac{1}{1+\exp(-y_j w^T x_j)}\right) - \lambda w^T w$$

The objective function, G(w|λ, D), is parameterized by the regularization coefficient, λ, whose value is chosen by experiment and the training data set D.

Figure 3:
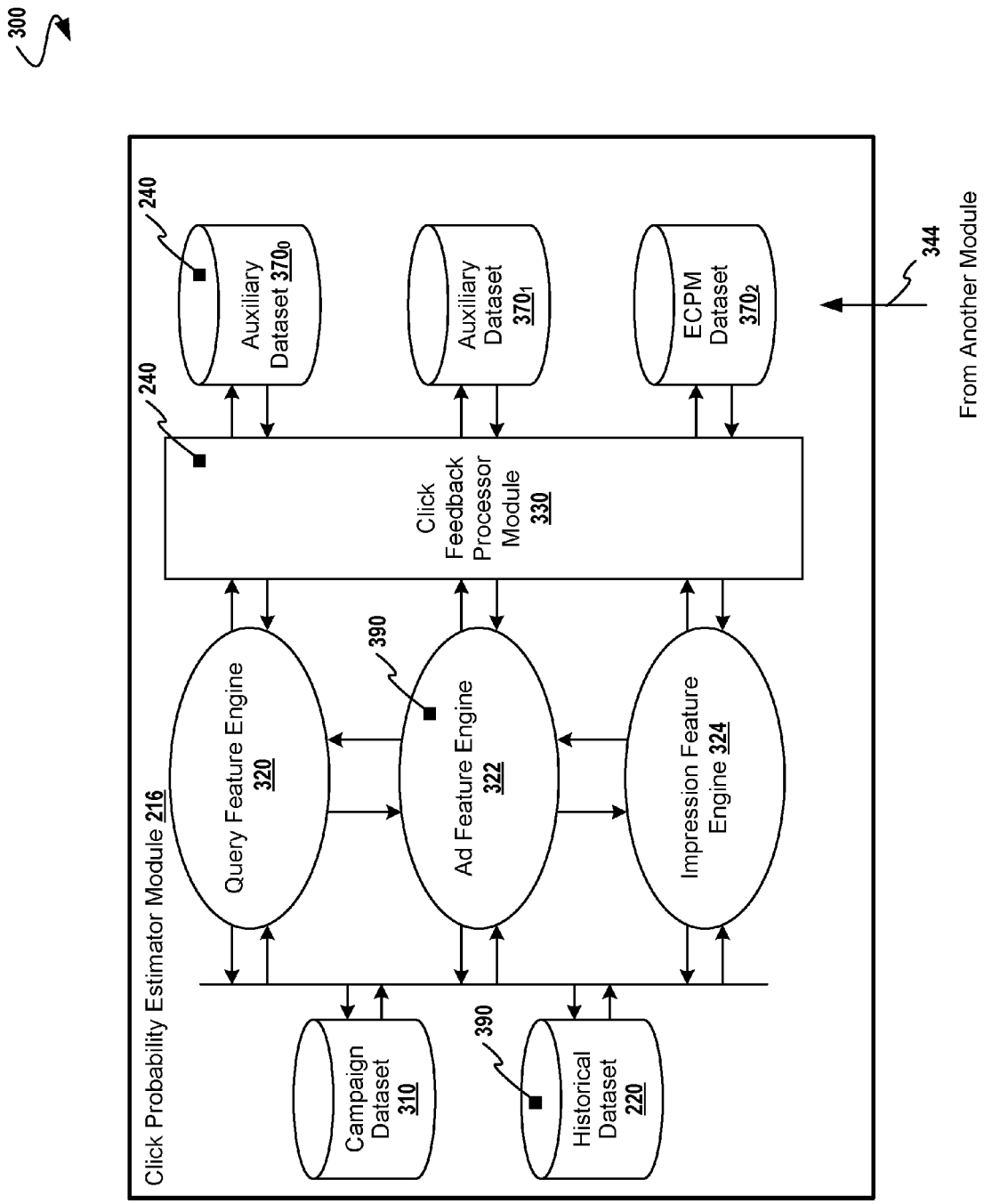
FIG. 3 depicts a system in which a click probability estimator module operates, according to one embodiment.

FIG. 3 depicts a system 300 in which a click probability estimator module 216 operates. As shown, features from a campaign dataset 310 and from a historical dataset 220 are extracted for providing inputs to a click feedback processor module 330. Other inputs to the click feedback processor may include calculated results from using a certain set of features provided by a query feature engine 320, and/or a using a certain set of features (e.g. a clicked slate 390, characteristics of clicks on an ad, etc) provided by an ad feature engine 322, and/or using a certain set of features provided by an impression feature engine 324. Results of the click feedback processor module 330 can be stored into a dataset (e.g. a first auxiliary dataset $370_0$, a second auxiliary dataset $370_1$, an ECPM dataset $370_2$, etc). Or, a dataset can include results calculated by any other module. Of course in other embodiments, any dataset (e.g. a first auxiliary dataset $370_0$, a second auxiliary dataset $370_1$, an ECPM dataset $370_2$, etc) may be stored in any convenient location, and the embodiments of system 300 are purely exemplary and not intended to be limiting.

Figure 2:
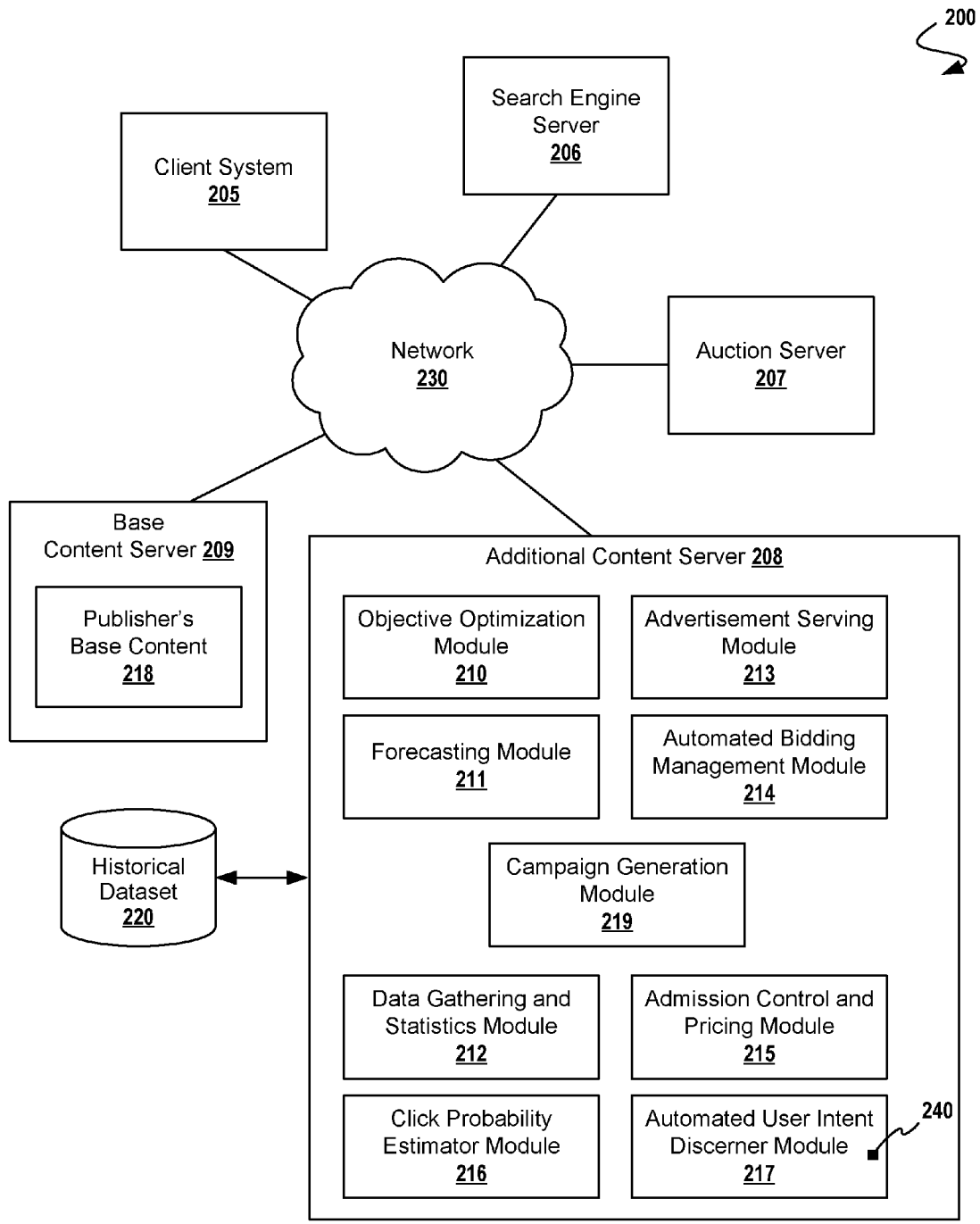
FIG. 2 depicts an online advertising system, according to an exemplary embodiment.

Continuing with the discussion of click probability estimator module 216 of FIG. 2 and FIG. 3, a query feature engine 320 can retrieve historical query features from a historical dataset 220. Or, an impression feature engine 324 can retrieve historical impression features from a historical dataset 220. Additionally, and as shown, an ad feature engine 322 can retrieve ad features, including clicks from a historical dataset 220 or from a campaign dataset 310. In accordance with the embodiment of FIG. 1, the campaign dataset 310 may be created by a campaign generation module 219.

The click feedback processor module 330 serves to produce estimates of CTR based on inputs from the query feature engine 320, the impression feature engine 324, ad feature engine 322, a historical dataset 220, and auxiliary datasets that can be provided in many forms (e.g. corresponding to the selection of a particular set of features). As shown, two auxiliary datasets are represented as a first auxiliary dataset $370_0$ and as a second auxiliary dataset $370_1$.

One approach to estimate the probability that an ad will be clicked p(c|x) is based on the number of clicks a particular ad drew divided by the number of impressions that displayed that same ad:

$$\text{CTR\_Estimate}_a = \frac{\text{numberofclicks}_a}{\text{numberofimpressions}_a} \quad \text{(Eq. 1)}$$

However, those skilled in the art will recognize that a historical dataset may include calculated results from using a more rich set of features (i.e. beyond merely the features used in Equation 1). The click feedback processor module 330 is configured so as to calculate click-through estimates (e.g. commercial intent-driven click feedback value 240) using any one or more techniques as are described herein. In particular, certain embodiments of the click feedback processor module 330 are configured so as to calculate click-through estimates using improved techniques (e.g. clicked slate driven techniques) for calculating click-through rate estimates in sponsored search.

The approach given in Equation 1 takes a uniform view of all impressions. In other words, a user's commercial intent is not factored in to the CTR estimation. Yet, if the user's commercial intent could be measured or even estimated, such a measurement or estimation could be advantageously used in estimating click through rates. In embodiments described here, the disclosed techniques use clicked slates in the computation of a reference CTR. A click on a page is a strong indicator of commercial intent and often ascertains that the user did scan some or all of the ads presented in the impression (i.e. further indicating commercial intent).

Figure 4A:
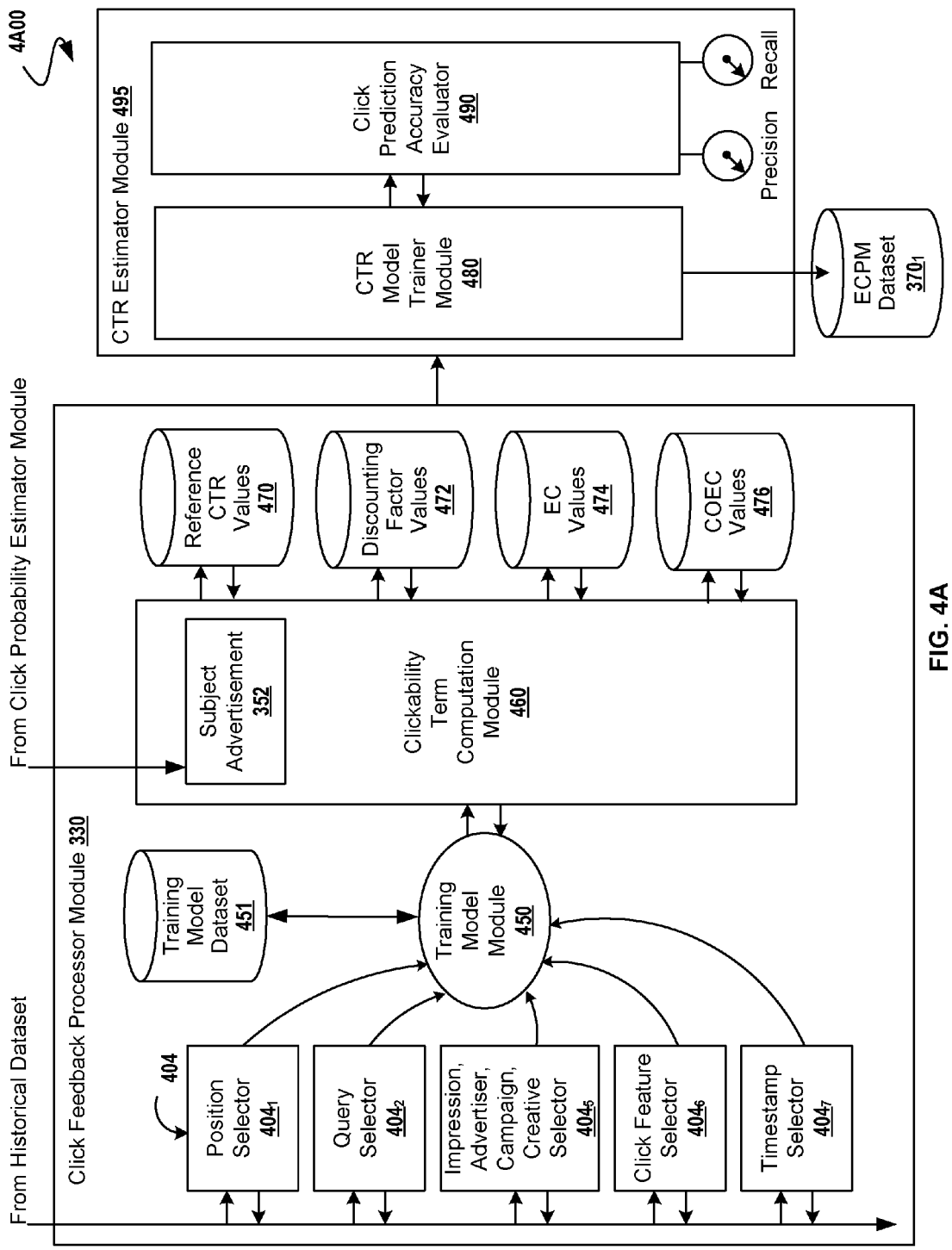
FIG. 4A depicts a system for a click feedback processor calculating clicks over expected clicks quantity (COEC quantity), according to one embodiment.

Improvements (e.g. as shown in FIG. 4A and in FIG. 4B) to estimator calculations achieve improved results by using clicked slates and click feedback features. For example, CTR estimator module 495 may include a click prediction accuracy evaluator 490 for calculating precision and recall. Click feedback features serve to achieve better statistical recall and precision. Additionally, some such estimators use a maximum entropy model trained to predict clickability.
Improved Click-Through Rate Estimators in Sponsored Search Advertising Returning to the discussion of FIG. 3, features from a campaign dataset 310 (e.g. a creative) and features from a historical dataset 220 (e.g. a clicked slate 390) can be extracted using a query feature engine 320, an ad feature engine 322, and an impression feature engine 324. Accordingly, a variety of features (i.e. both static and dynamic features) can be used to define and populate models (e.g. the aforementioned maximum entropy model) for predicting clickability. Among dynamic sources, features based on empirical CTRs (the ratio of clicks to impressions, as per Equation 1) encode feedback received from users. The first auxiliary dataset $370_0$ and/or the second auxiliary dataset $370_1$ can contain dynamic features like the empirical CTR. Also, since it is common to display several ads on a given impression in sponsored search advertising, the position at which an ad appears in the impression tends to influence its clickability. As earlier discussed, ads that are shown in a north sponsored ad area 120 have a higher likelihood of getting clicked merely by virtue of their position. Therefore, in computing clickability estimates for an ad, it is common to discount impressions based on the position at which it appeared—the intuition being that an advertisement appearing farther from the north sponsored ad area 120 position would have to appear several times at that position to cumulatively achieve the number of clicks of an ad appearing closer to the north sponsored ad area 120 position. The aforementioned discount can be quantitatively defined as $r_p$, which, together with additional quantitative values and techniques for prediction improvements, are described below.

Clicks Over Expected Clicks (COEC) in Sponsored Search Advertising

For a given query q and ad a let $click_{q,a}^p$ denote the total number of clicks at position p, and let $imp_{q,a}^p$, denote the total number of impressions at position p. Then, let $r_p$ denote the reference CTR for position p. The quantity "clicks over expected clicks," COEC(q,a) is defined as:

$$COEC(q,a) = \frac{\sum_p click_{q,a}^p}{\sum_p r_p imp_{q,a}^p} \quad (Eq. 2)$$

The denominator in Equation 2 is often referred to as expected clicks and is referred to herein as EC. EC and COEC are computed at several levels in a hierarchy (for example account, campaign, adgroup, creative) and used as features in the model that predicts clickability. EC often serves as a measure of confidence with larger values indicative of higher confidence in the corresponding COEC estimate. The term $r_p$ in the denominator of Equation 2 is referred to as the reference CTR and can be viewed as the probability of a random ad getting clicked when placed at position p:

$$r_p = \frac{clicks^p}{imp^p} \quad (Eq. 3)$$

In Equation 3, $clicks^p$ and $imp^p$ denote a total number of clicks and impressions at position p respectively. In some embodiments, a reference click-through rate (reference CTR) is estimated by computing the ratio of clicks to impressions over some large click log dataset (e.g. selected from historical dataset 220). In some embodiments, the term $r_p$ can be variously calculated, and can be considered a discounting factor (e.g. a global CTR per position calculated over a large random subset of click log data).

FIG. 4A depicts a system 4A00 for calculating clicks over expected clicks quantity (COEC quantity). As shown, the system 4A00 receives data from a historical dataset, from which dataset various data items can be retrieved. For example, the selectors 404 (specifically, the position selector $404_1$, the query selector $404_2$, the impression-advertiser-campaign-creative selector $404_5$, and the click selector $404_4$) serve to retrieve data items pertaining to an ad, such as the position, the query that precipitated the impression, the advertiser, the campaign, the creative pertaining to the ad, and so on. Such retrieved data items are then used by a clickability term computation module 460 which in turn serves to calculate and store reference CTR values 470, EC values 474, and COEC values 476. Thus, and again referring to Equation 3, $$r_p = \frac{clicks^p}{imp^p} \quad (Eq. 3)$$

it can be seen that $r_p$ can be calculated using the data aggregated from the position selector $404_1$, from the click selector $404_4$, in combination with the data available from the impression-advertiser-campaign-creative selector $404_5$. Other embodiments use variously calculated discounting factor values 472 in calculations.

Also, again referring to Equation 2, it can be seen that the numerator $click_{q,a}^p$ can be calculated and summed using data available from the click selector $404_4$ in combination with data available from the position selector $404_1$, data available from the query selector and data available from the impression-advertiser-campaign-creative selector $404_5$.

Similarly, the remaining portion of the denominator of Equation 2 can be calculated and summed using the data available from the impression-advertiser-campaign-creative selector $404_5$ in combination with data available from the position selector $404_1$, data available from the query selector $404_2$, data available from the impression-advertiser-campaign-creative selector $404_5$, and data available from click selector $404_4$.

Clickability Using Clicked Slates in Sponsored Search Advertising

While the system 4A00 of FIG. 4A provides an estimation of clicks over expected clicks (COEC), the COEC calculation according to Equation 2 assumes users always scan through all ads and that the users always have a commercial intent. However, many users perform searches without clicking on any ads, and reasonably might not, in fact, have a commercial intent. A consequence of this assumption is that impression counts (as shown in the denominator of Equation 2) tend to be unfairly large, which translates to unfairly lowered estimates of COEC. Further, a larger value of EC implicitly indicates less variance in the underlying COEC estimate, which larger value of EC may unfairly influence some explore/exploit systems that execute an explore strategy based on some function of EC values. The intuition behind this is that exploring ads with lower EC values might eventually lower the uncertainty in their COEC estimates.

As suggested above, a system that can infer commercial intent can be used to obtain a more representative reference CTR with which to discount impressions. One possibility for inferring commercial intent is to consider only the search results page impressions where at least one ad was clicked. Intuitively, a click on an advertisement within a search results page impression is a good indicator of users' commercial intent. The CTR estimation models that use data derived from 'clicked slates' show improvements over the models that do not use information from 'clicked slates'.

Let $\widehat{imp}^p$ denote the number of impressions at position p recorded from clicked slates. Using $\widehat{imp}^p$, it can be shown that the relationship between the regular reference CTR and the reference CTR estimated from clicked slates is a linear relationship. Let $\hat{r}_p$ denote a clicked slate reference CTR (e.g. a commercial intent-driven click feedback value):

$$\hat{r}_p = \frac{\sum_p click^p}{\sum_p \hat{imp}^p} \quad \text{(Eq. 4)}$$

$$= \frac{\sum_p click^p \sum_p imp^p}{\sum_p \hat{imp}^p \sum_p imp^p}$$

$$= r_p \frac{\sum_p imp^p}{\sum_p \hat{imp}^p}$$

$$= r_p \alpha_p$$

Equation 4 shows that there is indeed a linear relationship between $\hat{r}_p$ and $r_p$. The quantity $\alpha_p$ by definition is always greater than or equal to 1; hence $r_p \geq \hat{r}_p$. Despite the linear relationship, notice that the effects of including clicked slate reference CTR in the COEC estimate includes nonlinear behavior in the COEC estimates.

Figure 4B:
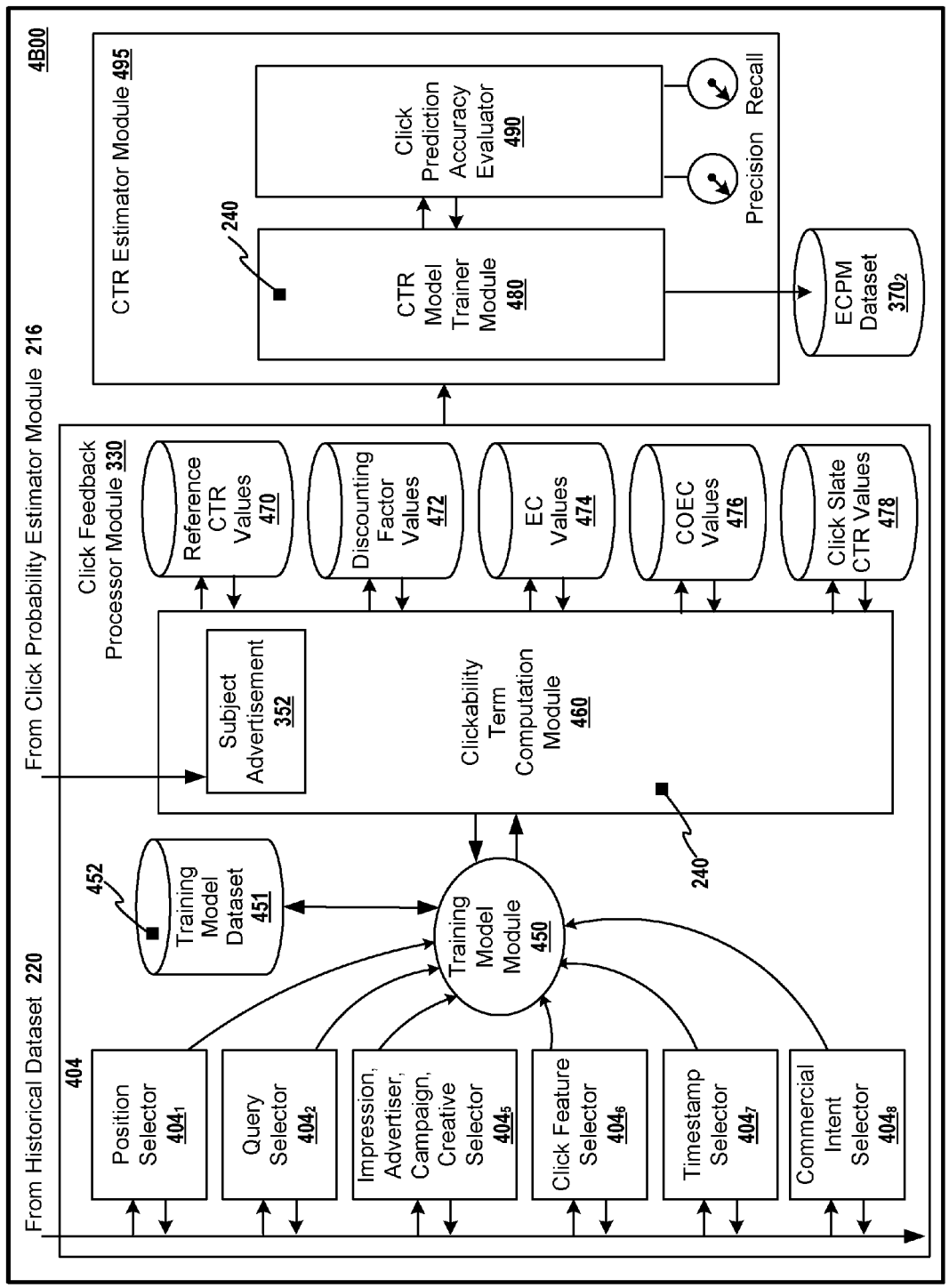
FIG. 4B depicts a system for a click feedback processor calculating clicks over expected clicks quantity using a commercial intent selector, according to one embodiment.

FIG. 4B depicts a system 4B00 for calculating clicks over expected clicks quantity using clicked slates. As shown the system 4B00 receives data from a historical dataset (see top left of FIG. 4B), from which dataset various data items can be retrieved. For example, the selectors 404 serve to retrieve data items pertaining to an ad such as the position, the query that precipitated the impression, the advertiser, the campaign and creative, and so on. Additionally, the system 4B00 of FIG. 4B also includes a commercial intent selector $404_8$, which serves to retrieve impressions and clicks of slates corresponding to queries that exhibit commercial intent. More particularly, in the embodiments shown, the commercial intent selector $404_8$ uses the historical dataset 220 to select the impressions where at least one ad was clicked such that those impressions and clicks can be assembled and used by the training model module 450 for storing to and retrieving from a training model dataset 451.

As shown, the training model module 450 communicates with a clickability term computation module 460, which in turn serves to calculate and then store one or more clicked slate CTR values 478. In various embodiments (and as shown) a subject advertisement 352 for which a clicked slate reference CTR (e.g. a commercial intent-driven click feedback value 240) is to be calculated. Also as shown, the clickability term computation module 460 uses the commercial intent-driven click feedback value 240 in order to estimate the likelihood that the subject advertisement will be clicked (i.e. with commercial intent) by the subject user from the search results page impression.

In some embodiments (and as shown in FIG. 4B) the subject advertisement 352 is received from a click probability estimator module 216. As shown above, $\hat{r}_p$ can be calculated using any of the variants of the right side of Equation 4. In particular, it can be seen that $\hat{r}_p$ can be calculated using the data aggregated from the position selector $404_1$, and from the click feature selector $404_6$, and from the impression-advertiser-campaign-creative selector $404_5$, in combination with the data available from the timestamp selector $404_7$ and the commercial intent selector $404_8$.

Continuing, any one or more of the clicked slate CTR values 478 can be used by an automated user intent discerner module 217, which in turn can use a CTR model trainer module 480 for further calculations and storage of an ECPM dataset $370_2$. In some embodiments (and as shown), in performing such calculations, a CTR model trainer module 480 can use at least one commercial intent-driven click feedback value 240, which value, in addition to other commercial intent-driven click feedback values, can be stored in an ECPM dataset $370_2$.

Of course the embodiments and corresponding descriptions of system 4B00 are merely exemplary, and methods for using intent-driven click-through rate estimates for a subject advertisement in sponsored search may be practiced within a wide range of architectures and environments capable of performing the steps of (1) populating a training model dataset (the training model dataset containing at least a history of clicks for an advertisement 454); (2) identifying the intent of the user (e.g. by processing the clicked slates to identify users' commercial intent); and (3) calculating an intent-driven click feedback value for the subject advertisement whereby calculating a commercial intent-driven click feedback value uses the data corresponding to those impressions generated by users having the same intent and uses the training model dataset.

In further embodiments, a CTR model trainer module 480 may work in conjunction with a click prediction accuracy evaluator 490 for measuring and possibly reporting precision and recall. Still more, such a click prediction accuracy evaluator 490, configured as shown, can be used for measuring the difference in precision and recall as compared between any techniques used within a CTR model trainer module 480.

In some embodiments, the user intent is detected from the training model dataset using features corresponding to slates from the most recent few hours. In other embodiments, the clicked slate is selected from the training model dataset using features corresponding to clicks only from a statically-determined time period (e.g. the last one day, the last one week, etc). In other embodiments, the clicked slate is selected from the training model dataset using features corresponding to clicks only from a dynamically-determined time period.

Figure 5:
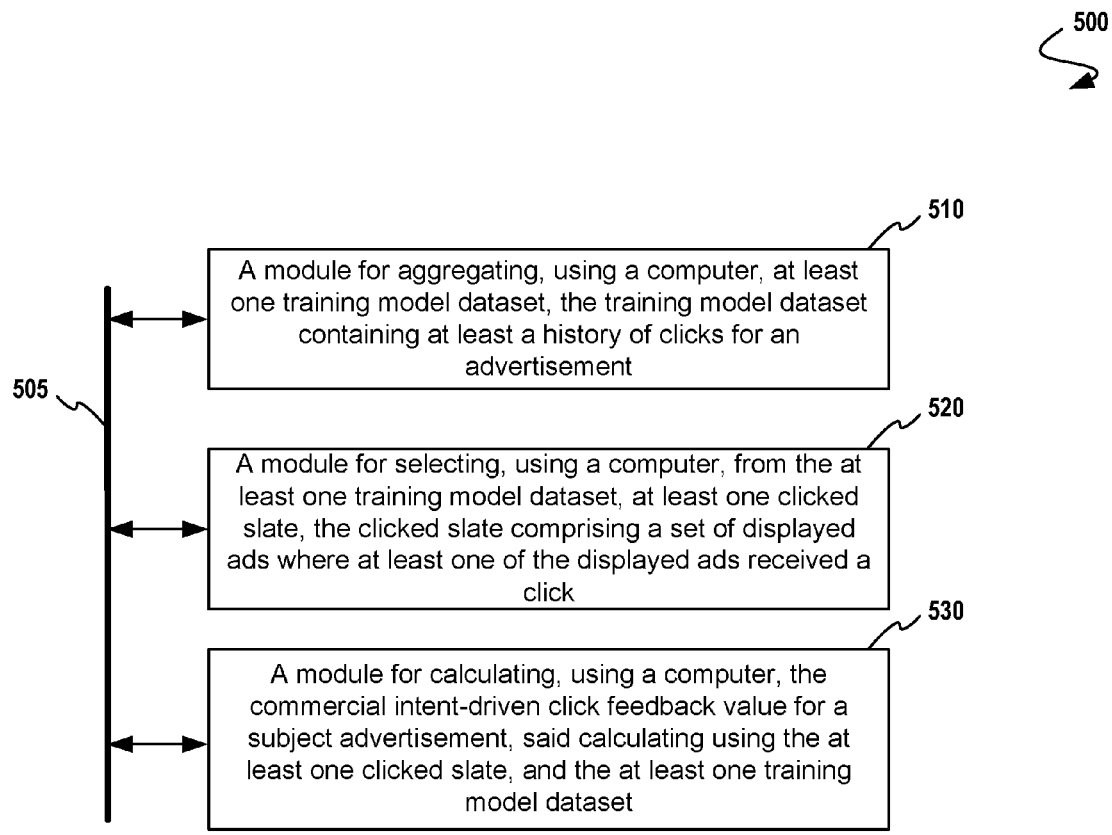
FIG. 5 depicts a block diagram of a system for using a commercial intent-driven click feedback value in sponsored search, according to one embodiment.

FIG. 5 depicts a block diagram of a system for using a commercial intent-driven click feedback value in sponsored search. As an option, the present system 500 may be implemented in the context of the architecture and functionality of the embodiments described herein. Of course, however, the system 500 or any operation therein may be carried out in any desired environment. As shown, system 500 comprises a plurality of modules, a module comprising at least one processor and a memory, each connected to a communication link 505, and any module can communicate with other modules over communication link 505. The modules of the system can, individually or in combination, perform method steps within system 500. Any method steps performed within system 500 may be performed in any order unless as may be specified in the claims. As shown, system 500 implements a method for using a commercial intent-driven click feedback value in sponsored search, the system 500 comprising modules for: aggregating, using a computer, at least one training model dataset, the training model dataset containing at least a history of clicks for an advertisement (see module 510); selecting, using a computer, from the at least one training model dataset, at least one clicked slate, the clicked slate comprising a set of clicked ads where at least one of the clicked ads received a click (see module 520); and calculating, using a computer, the commercial intent-driven click feedback value for a subject advertisement, the calculating using the at least one clicked slate, and the at least one training model dataset (see module 530).

The embodiment of the system 500 employs a technique whereby the click slate is selected from the training model dataset using features corresponding to clicks received within a certain time period (which time period may be determined statically determined or may be dynamically determined). Moreover the embodiment of the training model dataset within system 500 employs a maximum entropy training Aggregating into the training model may include aggregating from a position selector, from a click feature selector, from an impression-advertiser-campaign-creative selector, from a timestamp selector, and/or from a commercial intent selector.

Figure 6:
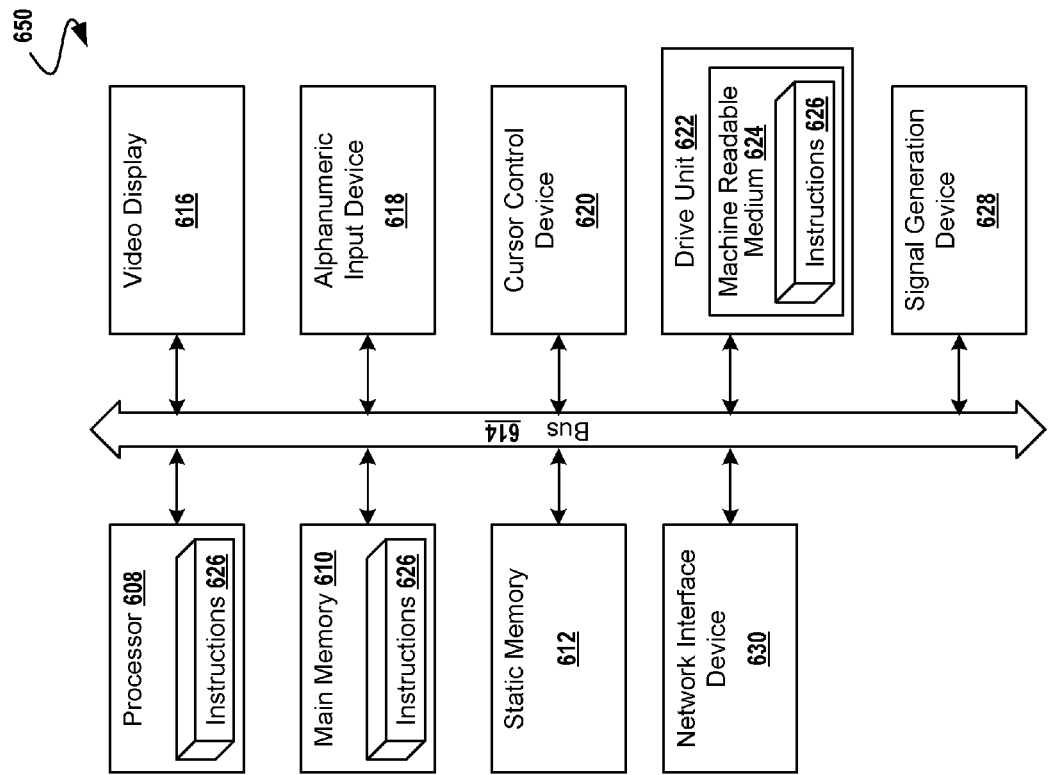
FIG. 6 depicts a diagrammatic representation of a network including nodes for client computer systems, nodes for server computer systems and nodes for network infrastructure, according to one embodiment.
Figure 6:
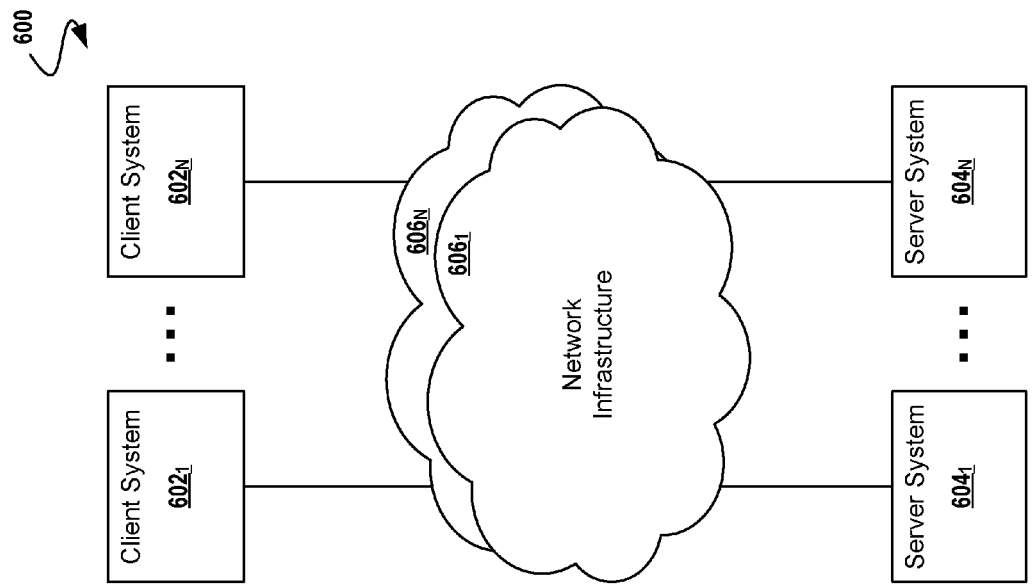

FIG. 6 is a diagrammatic representation of a network 600, including nodes for client computer systems 602$_1$ through 602$_N$, nodes for server computer systems 604$_1$ through 604$_N$, and nodes for network infrastructure 606$_1$ through 606$_N$, any of which nodes may comprise a machine (e.g. computer 650) within which a set of instructions for causing the machine to perform any one of the techniques discussed above may be executed. The embodiment shown is purely exemplary, and might be implemented in the context of one or more of the figures herein.

Any node of the network 600 may comprise a general-purpose processor, a digital signal processor (DSP), an application specific integrated circuit (ASIC), a field programmable gate array (FPGA) or other programmable logic device, a discrete gate or transistor logic, discrete hardware components, or any combination thereof capable to perform the functions described herein. A general-purpose processor may be a microprocessor, but in the alternative, the processor may be any conventional processor, controller, microcontroller, or state machine. A processor may also be implemented as a combination of computing devices (e.g. a combination of a DSP and a microprocessor, a plurality of microprocessors, one or more microprocessors in conjunction with a DSP core, or any other such configuration, etc).

In alternative embodiments, a node may comprise a machine in the form of a virtual machine (VM), a virtual server, a virtual client, a virtual desktop, a virtual volume, a network router, a network switch, a network bridge, a personal digital assistant (PDA), a cellular telephone, a web appliance, or any machine capable of executing a sequence of instructions that specify actions to be taken by that machine. Any node of the network may communicate cooperatively with another node on the network. In some embodiments, any node of the network may communicate cooperatively with every other node of the network. Further, any node or group of nodes on the network may comprise one or more computer systems (e.g. a client computer system, a server computer system) and/or may comprise one or more embedded computer systems, a massively parallel computer system, and/or a cloud computer system.

The computer system (e.g. computer 650) includes a processor 608 (e.g. a processor core, a microprocessor, a computing device, etc), a main memory (e.g. computer memory 610), and a static memory 612, which communicate with each other via a bus 614. The computer 650 may further include a display unit (e.g. computer display 616) that may comprise a touch-screen, or a liquid crystal display (LCD), or a light emitting diode (LED) display, or a cathode ray tube (CRT). As shown, the computer system also includes a human input/output (I/O) device 618 (e.g. a keyboard, an alphanumeric keypad, etc), a pointing device 620 (e.g. a mouse, a touch screen, etc), a drive unit 622 (e.g. a disk drive unit, a CD/DVD drive, a tangible computer-readable removable media drive, an SSD storage device, etc), a signal generation device 628 (e.g. a speaker, an audio output, etc), and a network interface device 630 (e.g. an Ethernet interface, a wired network interface, a wireless network interface, a propagated signal interface, etc). The drive unit 622 includes a machine-readable medium 624 on which is stored a set of instructions (i.e. software, firmware, middleware, etc) 626 embodying any one, or all, of the methodologies described above. The set of instructions 626 is also shown to reside, completely or at least partially, within the main memory and/or within the processor 608. The set of instructions 626 may further be transmitted or received via the network interface device 630 over the network bus 614.

It is to be understood that embodiments of this invention may be used as, or to support, a set of instructions executed upon some form of processing core (such as the CPU of a computer) or otherwise implemented or realized upon or within a machine- or computer-readable medium. A machine-readable medium includes any mechanism for storing or transmitting information in a form readable by a machine (e.g. a computer). For example, a machine-readable medium includes read-only memory (ROM); random access memory (RAM); magnetic disk storage media; optical storage media; flash memory devices; and electrical, optical or acoustical or any other type of media suitable for storing information.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for using a commercial intent-driven click feedback value in sponsored search, comprising:
    aggregating, using a computer, at least one training model dataset, the training model dataset containing at least a history of clicks for an advertisement;
    selecting, using a computer, from the at least one training model dataset, at least one clicked slate, the clicked slate comprising a set of displayed ads where at least one of the displayed ads received a click; and
    calculating, using a computer, the commercial intent-driven click feedback value for a subject advertisement, said calculating using the at least one clicked slate, and the at least one training model dataset.

2. The method of claim 1, wherein the at least one clicked slate is selected from the training model dataset using features corresponding to clicks received within only a statically-determined time period.

3. The method of claim 1, wherein the at least one clicked slate is selected from the training model dataset using features corresponding to clicks received within only a dynamically-determined time period.

4. The method of claim 1, wherein the at least one training model dataset is used to train a maximum entropy training model.

5. The method of claim 1, wherein the commercial intent-driven click feedback value is calculated using:

$$\hat{r}_p = \frac{\sum_p click^p}{\sum_p \hat{imp}^p}.$$

6. The method of claim 1, wherein the aggregating comprises aggregating from at least one of, a position selector, a click feature selector, an impression-advertiser-campaign-creative selector, a commercial intent selector or from a timestamp selector.

7. The method of claim 1, wherein the commercial intent-driven click feedback value is stored in an estimated clicks per impression dataset.

8. An advertising server network for using a commercial intent-driven click feedback value in sponsored search, comprising:
- a module, comprising at least one processor and memory, for aggregating at least one training model dataset, the training model dataset containing at least a history of clicks for an advertisement;
- a module, comprising at least one processor and memory, for selecting from the at least one training model dataset, at least one clicked slate, the clicked slate comprising a set of displayed ads where at least one of the displayed ads received a click; and
- a module, comprising at least one processor and memory, for calculating the commercial intent-driven click feedback value for a subject advertisement, said calculating using the at least one clicked slate, and the at least one training model dataset.

9. The advertising server network of claim 8, wherein the at least one clicked slate is selected from the training model dataset using features corresponding to clicks received within only a statically-determined time period.

10. The advertising server network of claim 8, wherein the at least one clicked slate is selected from the training model dataset using features corresponding to clicks received within only a dynamically-determined time period.

11. The advertising server network of claim 8, wherein the at least one training model dataset is used to train a maximum entropy training model.

12. The advertising server network of claim 8, wherein the commercial intent-driven click feedback value is calculated using:

$$\hat{r}_p = \frac{\sum\limits_p click^p}{\sum\limits_p \hat{imp}^p}.$$

13. The advertising server network of claim 8, wherein the aggregating comprises aggregating from at least one of, a position selector, a click feature selector, an impression-advertiser-campaign-creative selector, a commercial intent selector or from a timestamp selector.

14. The advertising server network of claim 8, wherein the commercial intent-driven click feedback value is stored in an estimated clicks per impression dataset.

15. A non-transitory computer readable medium comprising a set of instructions which, when executed by a computer, cause the computer to perform operations for using a commercial intent-driven click feedback value in sponsored search, comprising:, said instructions for:
- aggregating, using a computer, at least one training model dataset, the training model dataset containing at least a history of clicks for an advertisement;
- selecting, using a computer, from the at least one training model dataset, at least one clicked slate, the clicked slate comprising a set of displayed ads where at least one of the displayed ads received a click; and
- calculating, using a computer, the commercial intent-driven click feedback value for a subject advertisement, said calculating using the at least one clicked slate, and the at least one training model dataset.

16. The computer readable medium of claim 15, wherein the at least one clicked slate is selected from the training model dataset using features corresponding to clicks received within only a statically-determined time period.

17. The computer readable medium of claim 15, wherein the at least one clicked slate is selected from the training model dataset using features corresponding to clicks received within only a dynamically-determined time period.

18. The computer readable medium of claim 15, wherein the at least one training model dataset is used to train a maximum entropy training model.

19. The computer readable medium of claim 15, wherein the commercial intent-driven click feedback value is calculated using:

$$\hat{r}_p = \frac{\sum\limits_p click^p}{\sum\limits_p \hat{imp}^p}.$$

20. The computer readable medium of claim 15, wherein the aggregating comprises aggregating from at least one of, a position selector, a click feature selector, an impression-advertiser-campaign-creative selector, a commercial intent selector or from a timestamp selector.

* * * * *